United States Patent [19]

Vereschagin et al.

[11] 4,196,181
[45] Apr. 1, 1980

[54] MICROCRYSTALLINE MONOLITHIC CARBON MATERIAL

[76] Inventors: Leonid F. Vereschagin, Kutuzovsky prospekt, 1/2, kv. 231; Evgeny N. Yakovlev, ulitsa Kravchenko 8, kv. 240; Vladislav N. Slesarev, mikroraion 4 "a", korpus 11, kv. 130; Vasily A. Stepanov, ulitsa Shvernika, 6/2, korpus 2, kv. 32; Alexandr Y. Preobrazhensky, ulitsa Profsojuznaya 52, korpus 5, kv. 21, all of Moscow; Tatyana D. Varfolomeeva, ulitsa Shkolnaya, 6, kv. 35, Moskovskaya oblast, Podolsky ralon, p/o Akademgorodek; Ljudmila E. Shterenberg, B. Dekabrskaya ulitsa, 18, korpus 13, kv. 21, Moscow, all of U.S.S.R.

[21] Appl. No.: 918,766

[22] Filed: Jun. 26, 1978

Related U.S. Application Data

[63] Continuation of Ser. No. 511,799, Oct. 3, 1974, abandoned, which is a continuation of Ser. No. 393,401, Aug. 31, 1973, abandoned.

[30] Foreign Application Priority Data

Mar. 20, 1973 [SU] U.S.S.R. .................. 1890751

[51] Int. Cl.$^2$ ............................................. C01B 31/06
[52] U.S. Cl. ........................................ 423/446; 51/293
[58] Field of Search .................. 423/446; 51/293, 307

[56] References Cited

U.S. PATENT DOCUMENTS

| | | | |
|---|---|---|---|
| 3,399,254 | 8/1968 | Dunnington | 423/446 |
| 3,407,445 | 10/1968 | Strong | 423/446 |
| 3,829,544 | 8/1974 | Hall | 51/307 |
| 3,949,062 | 4/1976 | Vereschagin et al. | 423/446 |

*Primary Examiner*—Earl C. Thomas
*Attorney, Agent, or Firm*—Holman & Stern

[57] ABSTRACT

A material consisting of grains varying in size from 0.1 to a few microns intergrown so as to form regular aggregates. The geometric shape of the material is preset by a pattern made from a carbon-bearing non-diamond material and corresponds to the shape of the required finished article. The material can be made in any desired number of identical shapes.

2 Claims, 4 Drawing Figures

MICROCRYSTALLINE MONOLITHIC CARBON MATERIAL

This is a continuation of application Ser. No. 511,799, filed Oct. 3, 1974, and now abandoned which in turn is a continuation of application Ser. No. 393,401 filed Aug. 31, 1973, and now abandoned.

The present invention relates to microcrystalline monolithic carbon materials and more specifically it relates to diamond aggregates consisting of microscopic grains.

The present invention can be used successfully for making machine elements, e.g. sliding contact bearings, working elements of tools (boring bits and drills, cutting tools, glass cutters, draw plates), containers, jewelry, etc. The natural polycrystalline diamonds are termed "carbonado." Carbonado is a porous aggregate having a density of 3.10–3.45 g/cm$^3$ consisting of diamond grains varying in size from a few fractions of a micron to 20 microns. Carbonado occurs very rarely in diamond fields (approximately 0.1 percent of the world output) and in the form of lumps having irregular random shapes which strongly hampers their employment.

Also known in the art is a synthetic polycrystalline diamond material in the form of low-strength macrocrystalline formations, so-called druses manufactured by the method covered by French Pat. No. 1,303,712, in the form of bodies having an elementary geometric shape with a rough surface. The size of the diamond grains in this material is about 0.5 mm, the density of the material is about 3.55 g/cm$^3$ and the surface roughness is about twice the grain size, i.e. up to 1.0 mm. In this type of adherence of grains, in the form of a free-growing druse, the possibility of fabricating finished articles with the preset shape and surface finish becomes practically unattainable. The transformation of such a druse even into a relatively simple shape with a preset surface finish calls for difficult and long machining, for example by grinding.

A synthetic fine-grained diamond material in the form of compacted shapes produced by the method disclosed by the U.S. Pat. No. 3,574,580, having the form of bodies of an elementary geometric shape whose surface smoothness is determined by the walls of the container is known in the art. This material is produced by sintering a diamond powder, mostly with a grain size of from 0.5–5.0 microns and is characterized by a density below 3.5 g/cm$^3$ and a low mechanical strength which calls for taking special precautions while reducing the pressure after sintering so as to avoid destroying the compact. The low mechanical strength of such diamond compacts rsults mainly from the absence of the concretion of grains which can be seen during a structural examination. The shape of the diamond compact depends on the shape of the container. This limits the variety of the practically attainable diamond compact shades to simple geometric figures (e.g. a solid cylinder). The differences in the thermo mechanical properties of the container material and diamond powder in the process of producing the polycrystalline diamond compacts by the known method will become especially prominent in the manufacture of diamond compacts having a complex shape. Thus, the diamond compacts produced by the known method are not promising for making polycrystalline diamond formations of the required shape and surface finish, whose strength and abrasion characteristics would be comparable to those of the natural polycrystalline diamonds.

An object of the present invention resides in producing a monolithic microcrystalline material of carbon with a diamond structure.

Another object of the present invention resides in the production of a monolithic microcrystalline material of carbon with a diamond structure in the form of articles of a preset shape with a surface finish within 10–60 microns.

Still another object of the present invention resides in improving the mechanical, abrasive and other properties of the monolithic microcrystalline material of carbon having a diamond structure.

A still further object of the present invention resides in ensuring the compaction of the grains of the monolithic microcrystalline material of carbon with a diamond structure into regular aggregates.

These and other objects of the present invention are accomplished by transforming the non-diamond carbon-bearing material into a microcrystalline monolithic material crystallized to the diamond structure; consisting of intergrown grains varying in size from 0.1 micron to a few microns and characterized, according to the present invention, in that said monolithic material has a preset geometric shape which corresponds in shape and size to the desired finished article, and which is manufactured in any desired number of identical items, has a density above 3.55 g/cm$^3$, an abrasion resistance above 100,000, an oxidation temperature in the air above 700° C. and a hardness such that it can scratch the hardest face of the diamond i.e. the octahedral surface, a lattice constant $a_o = 3.566$ Å at a temperature of 25° C. and a pressure of 1 atm, a preset surface finish of from 10–60 microns and with grains intergrowing into regular aggregates.

The invention will become more apparent from the following description with reference to the accompanying drawings, in which.

The equipment used for applying the high pressure to the non-diamond carbon-bearing material is a modification of the device used for building up high pressure covered by the French Pat. No. 7,102,157. This modification is shown to scale in FIG. 1.

Figure 1:
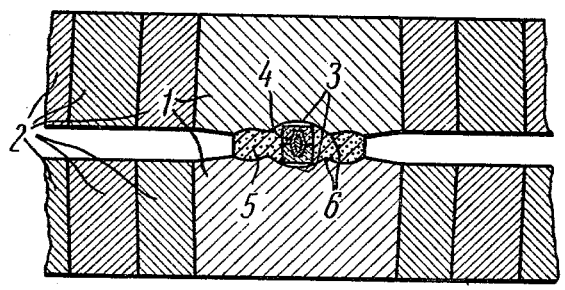
FIG. 1 shows a version of the chamber with anvils used for the realization of the present invention.

The chamber illustrated in FIG. 1 consists of two halves and is formed by two centrally-mounted punches 1 opposing each other, pressed into a structure of concentric binding rings 2 ensuring a sufficient axial support for the punches 1 and protecting them against destruction in the process of transforming the non-diamond carbon-bearing material into a microcrystalline monolithic material of carbon having a diamond structure. The best material for the punches 1 was found to be a hard alloy based on tungsten carbide (94% WC, 6% Co). The design modification of the punches 1 used in the present invention consists in the particular shape of their working surface, and in the dimensions and shape of hollows 3 on this surface. An alloy of steel with a minimum tensile strength of 150 kg/cm$^2$ hardened to 48–50 $R_c$ has proven to be a satisfactory material for the binding rings which support the punches 1.

Figure 2:
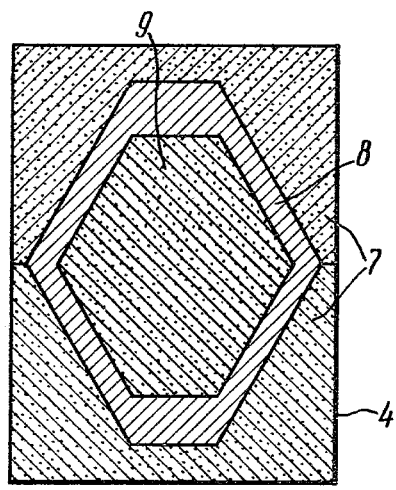
FIG. 2 shows a reaction cell for the chamber illustrated in FIG. 1.
Figure 3:
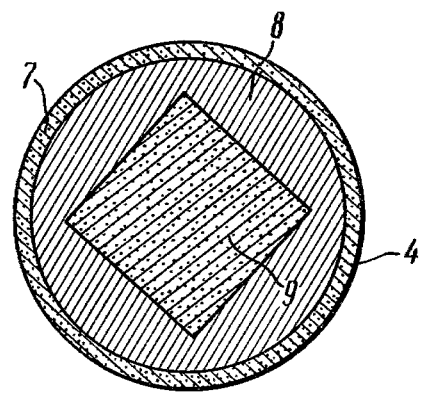
FIG. 3 is a cross-section through a reaction cell (top view) showing in FIG. 2, illustrating the relative arrangement of its parts.

Another improvement in the present invention relates to the method of sealing. The high pressure chamber shown in FIG. 1 is sealed with dense limestone referred to as a lithographic stone which is simultaneously used as the medium for conveying the pressure to a reaction cell 4 (FIGS. 1, 2, 3). The lithographic stone is used for making a pellet 5 (FIG. 1) whose face surfaces repeat the configuration of the mould made from the surface of the hollows 3 of the punches 1. A channel located in the centre of the pellet 5, and perpendicular to its surface, accommodates the reaction cell 4. The height of the pellet 5 has been selected experimentally so that when the pressure inside the reaction cell 4 reaches the value required for transforming the non-diamond carbon-bearing material into a microcrystalline monolithic material of carbon with a diamond structure, the distance between the projections 6 on the working surfaces of the punches 1 is equal to 1 mm approximately. When the punches 1 are brought together and compressed, the material of the pellet 5 forms a shaped seal between them which makes it possible to reliably lock the high pressure chamber (FIG. 1) at all changes in the pressure and temperature and, in particular, during the pulse heating of the precompressed reaction cell 4.

The reaction cell 4 is placed into the pellet 5 (FIG. 1) between the faces of the punches 1. In the capacity of the compressible element the reaction cell 4 comprises a heater 7, a catalyst 8 and a carbon-bearing non-diamond material, mostly graphite which serves as a pattern 9 for the article of the microcrystalline monolithic material of carbon with a diamond structure whose shape and surface finish depend on the shape and surface finish of the pattern 9. The location and interaction of the individual parts of the reaction cell 4 is shown in FIGS. 2 and 3.

The heater 7 consists of two parts which, taken together, form a round hollow cylinder closed at the ends, the height of which is equal to, or larger than, the height of the pellet 5 while its diameter ensures tight fitting of the heater 7 into the pellet 5.

It is practicable that the heater 7 should be made of graphite.

The catalyst 8 for transforming the non-diamond carbon-bearing material into a microcrystalline monolithic material of carbon having a diamond structure is used in the present invention in the form of a fine-grained powder. The catalyst 8 is placed inside the heater 7 filling the entire free space around the pattern 9.

The catalyst 8 should be selected from the known metals, alloys and compounds which are used in transforming carbon-bearing materials under the effect of high pressure and temperature into diamond, e.g. the metals of group VIII of the periodic system, their alloys, carbides and metal-carbide systems.

The pattern 9 of the non-diamond carbon-bearing material is made mostly from graphite which is shaped like the finished article and the surface of the pattern 9 is machined to a surface finish which is one or two classes higher than the desired surface finish of the finished article of the microcrystalline monolithic material of carbon having the diamond structure. The pattern 9 made in this way is dipped into the powdered catalyst 8 inside the hollow heater 7 and placed centrally with relation to the heater 7 and the powdered catalyst 8 inside it.

The chamber shown in FIG. 1 ensures the building-up of the pressure required for transforming the non-diamond carbon-bearing material into a microcrystalline monolithic material of carbon with a diamond structure. The chamber (FIG. 1) is placed between the anvil plates of a suitable press (not shown in the drawing) then the halves of the chamber (FIG. 1) are brought together in the direction perpendicular to the chamber plane and, as a result, the pellet 5 and the reaction cell 4 are compressed to a point in which a high pressure is reached inside the reaction cell. The chamber has been calibrated for high pressure by the use of conventional methods. These methods include the effect of known pressures on certain metals in which phase transformations occur under the effect of pressure. The phase transformations in these metals are registered by the changes in their electrical properties. For example an important point on the pressure calibration curve for the given invention is the point corresponding to the transformation $B_iV$–$B_iVI$ at which the electrical resistance of Bi at a pressure of 89 kbars decreases in a step-by-step manner. For calibrating the chamber by this method the following transformations in bismuth have been used: Bi I→Bi II at 25.4 kbars, Bi II→Bi III at 26.9 kbars, Bi V→Bi VI at 89 kbars; in thallium: T1 I→T1 II at 36.7 kbars and in Ba: Ba I→Ba II at 59 kbars. The chamber shown in FIG. 1 and calibrated by the above described method ensures the building up of the required pressure in the reaction cell any required number of times.

Figure 4:
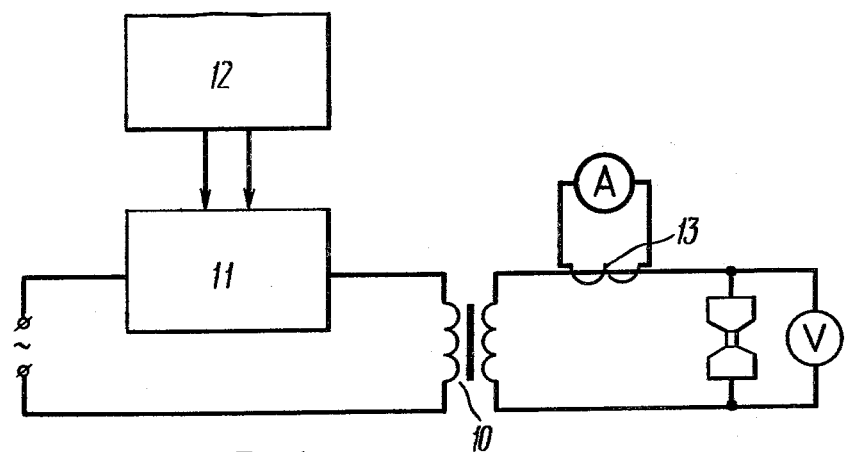
FIG. 4 shows a general circuit diagram for electric heating of the reaction cell shown in FIG. 2.

The rise of the temperature in the high pressure chamber shown in FIG. 1 inside the reaction cell 4 is achieved by passing an electric current through the conducting section of the reaction cell 4. Heating is ensured by the Joule heat produced simultaneously in the graphite pattern 9, the powdered catalyst 8 and heater 7 when an electric pulse passes through them. The electric current is supplied to the reaction cell 4 through the chamber punches 1, the press anvils and the copper busbars (not shown in the drawing) connected to a source of power supply. The electric contact between the punch 1 and the reaction cell 4 is ensured in the course of compression of the reaction cell 4 in the chamber, with the contact surfaces being formed by the faces of the reaction cell 4 and the corresponding parts of the working surfaces and hollows 3 of the punches 1 directly resting on the faces of the reaction cell 4. The contact resistance has become constant close to a pressure of 10 kbars approximately. The temperature inside the reaction cell 4 can be raised quickly and for a short duration according to the present invention by means of, say, an electric circuit into which a battery of capacitors is discharged so that the discharge current passes through the reaction cell 4 and raises its temperature. A somewhat slower rise of temperature inside the reaction cell 4 can be ensured with the aid of a conventional heating layout shown in FIG. 4 and comprising a power transformer 10, a magnetic amplifier 11, a voltage stabilizer 12, a current transformer 13 and the reaction cell 4. The latter method of heating in order to raise the temperature to at least 1500° C. in the course of about 1 sec consists in supplying the preselected electric power to the reaction cell 4. The temperature inside the reaction cell 4 may be determined by calculations or calibration. The calibrating experiments for temperature have been conducted by establishing the relation between the electric power applied to the reaction cell 4 and the readings of the thermocouple whose contact has been installed inside the reaction cell 4. The durations of the calibrating and the basic experiments have been coordinated as well as the conditions of heat dissipation. The temperatures and the corresponding values of electric power have been determined as a mean figure for a large number of experiments. The temperature transmitter has been constituted by a platinum-and-platinum-rhodium (10% rhodium) thermocouple. The temperatures higher than 1500° C. inside the reaction cell 4 have been determined by extrapolating the relation between the electric power connectd to the reaction cell and the temperature inside it. In the implementation of the present invention we have used the method of producing polycrystalline diamond aggregates of the preset shape covered by the U.S.S.R. Author's Certificate No. 3,29,761, French Pat. No. 7,047,562, and British Pat. No. 1,300,650. This method consists in the following: the pattern made from a non-diamond carbon-bearing material is shaped as the desired article from a microcrystalline monolithic material consisting of carbon with a diamond structure. The surface of the pattern 9 is machined to a surface finish higher than that required on the surface of the microcrystalline monolithic material of carbon with a diamond structure. Then the pattern 9 is placed into a powdered catalyst 8 consisting of, say, metals of group VIII of the periodic system, their alloys, carbides or metal-carbide systems and subjected to high pressure, that of at least about 80 kbars. It is essential that the pressure should be applied uniformly to the entire surface of the pattern 9 so as to preserve its shape and condition during the course of compression, particularly in the case where the pattern 9 has a complex shape and a high surface finish.

The uniformity of compression of the non-diamond carbon-bearing materials, e.g. graphite, pattern 9 by the external pressure depends both on the properties of graphite of which the pattern is made and on the properties of the pressure-transmitting medium.

Therefore, the patterns 9 of a complex shape with a high surface finish are made from graphite with a high processability both with respect to the process of making the pattern with a certain profile and surface finish and with respect to compression by a high pressure. The medium for transmitting pressure directly to the pattern 9 is constituted by the powdered catalyst 8. The powdered catalyst 8 is sufficiently simple to use and ensures the attainment of the hydrostatic pressure in direct proportion to the coefficient of filling the relief of the pattern 9 with the powdered catalyst 8. Thus, when dipping the pattern 9 of the non-diamond carbon-bearing material into the powdered catalyst 8, all measures must be taken so as to ensure a better filling of the spaces and hollows in the pattern and around it. The composition and quantity of the powdered catalyst 8 as well as the standard of filling which ensures a uniform compression of the pattern 9 shall be selected experimentally. It should be noted that the higher the isotropy of the compressibility of the graphite used and the weaker the cohesion of its particles throughout the process of compression, the better will be the preservation of the details of the relief of the pattern 9 made of, say, graphite. After compression, the non-diamond carbon-bearing pattern immersed into the powder catalyst 8 is heated by an electric current pulse to at least about 1500° C. in the course of from 0.1-10 s. This period of time is sufficient for forming the microcrystalline monolithic material consisting of carbon having a diamond structure.

The transformation of the non-diamond carbon-bearing pattern 9 into a microcrystalline monolithic material of carbon with a diamond structure is favoured by a rapid crystallization under the conditions of heavy supersaturation. The microcrystalline structure of the formed monolithic material of carbon with a diamond structure makes it possible, in its turn, to preserve the preset shape and surface profile of the pattern 9 due to the small dimensions of the diamond crystals which are reliably linked with one another and of which said carbon material consists. The small dimensions and large number of crystals constituting the microcrystalline monolithic material of carbon with a diamond structure are formed due to an extensive surface contact between the powdered catalyst 8 and the non-diamond carbon-bearing material of the pattern 9 and, as a result, produces a multitude of crystallization centres. The non-diamond carbon-bearing pattern 9 is transformed into the microcrystalline monolithic material of carbon with a diamond structure during the course of the action of the electric pulse. A high degree of geometric similarity between the pattern 9 and the microcrystalline monolithic material of carbon with a diamond structure is achieved also due to the isothermality of the conditions under which the non-diamond carbon-bearing pattern 9 is transformed into a microcrystalline monolithic material of carbon with a diamond structure in all the multitudinous points of contact between said pattern 9 and the powdered catalyst 8. These conditions are realized due to the high speed of transformation and thus produce such an effect according to which the higher the homogeneity of the structure and composition of the souce materials, i.e. the non-diamond carbon-bearing material, e.g. graphite and catalyst, the smaller will be the deviations from the preset shape and surface finish of the microcrystalline monolithic material of carbon with a diamond structure.

The finished articles from the microcrystalline monolithic material of carbon with a diamond structure have been subjected to morphological and micromorphological analyses. It has been found that the material according to the invention ensures the required accuracy in reproducing the preset shape and surface finish of the pattern 9 by the method covered by the U.S.S.R. Author's Certificate No. 3,29,761, by French Pat. No. 7,047,562, and British Pat. No. 1,300,650. The morphological examination of the material according to the invention has been carried out both through a binocular microscope with magnifications of from 20–40, and with the naked eye. The microscopic examination of the sections of the material according to the invention with magnifications of about 500 conducted with the aid of a metallographic microscope has made it possible to observe the inclusions of the catalyst admixture in the form of thin interlayers (about 1 micron thick) between some diamond crystallites constituting the basis of the material according to the invention. The structural examination of the material according to the invention through an electronic microscope has made it possible to determine the size of the individual diamond grains and to discover regular concretions of grains that are characteristic of said material. The size of the individual diamond grains as determined by these experiments has been found to vary from 0.1 micron to a few microns. Similar results in determining the grain size of the material according to the invention have been obtained by X-ray examinations of the lauephotographs of the specimens of said material. The X-ray structural examination of the lattice of the material has been carried out by X-raying the specimens of the said material together with a reference standard consisting of common salt. The examination was made with a C-radiation and Ni-filter. The lattice constant calculated from these examinations for the material according to the invention is equal to $a_o = 3.566$ Å. The X-ray spectrographic analysis of the sections of the material according to the invention has yielded results similar to those of the metallographic examination with relation to the quantity and location of the catalyst inclusions and has confirmed the metal-carbon composition of these inclusions, the metal component of the inclusion being formed by the catalyst used for transforming the non-diamond carbon-bearing material into a microcrystalline material of carbon having the diamond structure. The density of the material according to the invention has been measured both with the aid of a micropycnometer and with the aid of a Clerichy solution. In the first case the measurements have been made with a specially graduated capillary tube and a fraction of the material crushed into particles having a size of $\leq 1$ mm. The capillary pycnometer has been filled with ethyl alcohol. The density of the material according to the invention fabricated into articles of the preset shape having a size of a few millimeters has been determined by immersing them into the Clerichy solution of a known density. The results of the density tests made by both of the above-mentioned methods produced a value exceeding 3.55 g/cm$^3$. The superior hardness and the abrasive resistance of diamond have made it necessary to determine these characteristics of the material according to the invention. The abrasion resistance of the material according to the invention has been determined by the relation to the difference in the weights of the grinding stone before and after dressing it with the material according to the invention to the difference between the weights of the material according to the invention before and after dressing. The grinding stones dressed by the material according to the invention have been selected from medium-hard and hard groups that are habitually dressed with diamond tools. The value of abrasion resistance obtained by these tests has reliably exceeded 100,000. The comparative estimation of the hardness of the material according to the invention has been made by the scratching method. For this purpose the hardest face of a low-crystalline, including natural, diamond has been scratched with a sharp edge of the article made of the material according to the invention. It is known that the hardest face in the diamond is the one coinciding with the surface (III)—the surface of octahedron. In view of the fact that the material according to the invention is characterized by a high hardness and abrasion resistance and can be widely employed in tools whose working elements are heated in service to high temperatures, said material has been examined for heat resistance by determining its oxidation point in the air. For this purpose the material according to the invention has been placed in an oven and heated for a certain time at a fixed temperature. The temperarure of the beginning of oxidation has been registered with a shielded chromel-alumel thermocouple and has been referred to as the moment of the beginning of reduction in the weight of the material. The tests have shown that the temperature at which the material according to the invention starts oxidizing in the air exceeds 700° C.

The microcrystalline monolithic material of carbon with a diamond structure according to the invention can be used widely in the metal-working, mining, machine-building and other industries as well as in other fields of a country's economy. While possessing the merits of the known microcrystalline monolithic materials of carbon with a diamond structure, the material according to the invention is also characterized by a number of advantageous properties that are absent in the known materials. For example, as compared with the known natural modification of the polycrystalline diamond called carbonado which occurs in the form of lumps having a random irregular shape, the material according to the invention is made in the form of a preset correct shape in the form of a certain article. The surface of the natural carbonado as well as its geometry is not of any definite nature whereas the material according to the invention has a predetermined quality of the surface characterized by a certain class of surface finish. The highest hardness and wear resistance of carbonado among the known natural and artificial materials are to a considerable extent due to the microcrystalline structure of this diamond polycrystal. The material according to the invention is also characterized by the microcrystalline structure but is distinguished by the fact that its grains are often intergrown into strong concretions obeying a certain crystallographic law, and forming the so-called regular aggregates which cannot be observed in natural carbonado. The high hardness and wear resistance of the material according to the invention become particularly conspicuous during the comparative tests in rock-breaking tools (boring bits, drills, etc.). Thus, all other conditions being equal, the tools used for boring granite strata equipped with the cutting elements of the material according to the invention have given more than a three-fold gain in the boring depth as compared with the tools equipped with the natural single-crystal diamonds. These high mechanical properties of the material according to the invention are due mostly to the small grain size (from 0.1 to a few mirons) and the reliable concretion of the diamond grains of which said material is composed.

The considerations set forth above help in understanding the difficulties encountered in processing carbonado for using it in tools and for other applications and the advantages provided by the material according to the invention which are characterized by the preset shape and surface finish. The density of the microcrystalline monolithic material of carbon with a diamond structure according to the invention is higher than that of the natural carbonado while the composition of admixtures, the quantity and distribution of inclusions are such that said material is a rigid monolith as distinct from the natural carbonado which is a porous aggregate. The use of the systems which form thin inclusions of a high hardness, reliably adhering to the diamond crystallites in the capacity of catalysts for transforming the non-diamond carbon-bearing material into a microcrystalline monolithic material of carbon having a diamond structure promotes the formation of a monolithic non-porous structure with high mechanical characteristics.

The synthetic diamond material produced by the known method covered by French Pat. No. 1303712, takes the form of macrocrystalline druses characterized by a general contour of a preset shape and a rough (uncontrollable) surface. On the contrary, the material according to the invention is of a microcrystalline nature, i.e. the size of its diamond like grains varies from 0.1 to a few microns which is 1000–100 times smaller than the size of the grains in the druses of the synthetic diamond material produced by the known method. The adherence of the grains in the druses of the synthetic diamond material produced by the known method is rather low whereas in the material according to the invention the high coalescence of individual grains is caused by their concretion and the formation of a microcrystalline monolith. Both in the large size of the individual crystals constituting the druses in the synthetic diamond material produced by the known method and in the fact that the conditions of growth of said crystals are not uniform results in the irregular growth of the druse in various directions and thus forms a rough surface. The material according to the invention is characterized by a microcrystalline structure, a preset shape and surface finish which makes it possible to fabricate it in the form of finished particles.

The synthetic material produced by sintering the fine-grained diamond powder according to the method covered by U.S. Pat. No. 3,574,580, is known for a low mechanical strength while its external shape depends on the container in which the diamond powder is sintered. As it follows from the very method of producing the known synthetic material, the process of sintering under high pressure forms a tightly-pressed compact of diamond particles which, however, do not coalesce with each other. The absence of coalescence between the diamond particles which is quite obvious during the metallographic analysis produces a structure sharply differing from the structure of the material according to the invention which constitutes a substantial cause of the low mechanical strength for such compacts. The material according to the invention is characterized by a monolithic structure formed by tightly intergrown microscopic diamond grains and ensures its high density, high mechanical strength and high abrasion resistance.

What we claim is:

1. A microcrystalline monolithic material of carbon crystallized to a diamond structure, consisting of intergrown grains varying in size from 0.1 to a few microns, said grains being coalesced with each other to form regular aggregates, said material having a reproducible, predetermined geometric shape corresponding to that of its non-diamond carbon-bearing material precursor, a density higher than 3.55 g/cm$^3$, an abrasion resistance higher than 100,000 an oxidation temperature in the air higher than 700° C., a hardness such that it scratches the octahedral surface of diamond, a lattice constant $a_o = 3.566$ Å at a temperature of 25° C. and a pressure of 1 atm., and a preset surface finish within 10–60 microns.

2. A microcrystalline monolithic material of carbon according to claim 1 having a reproducible, predetermined correct geometric shape corresponding to that of its non-diamond carbon-bearing material precursor.

* * * * *